United States Patent
Duijnhoven Van et al.

(10) Patent No.: US 9,050,843 B2
(45) Date of Patent: Jun. 9, 2015

(54) MICROSPHERE COMPRISING A POLYMER CORE, A SHELL AND AN ABSORBER

(75) Inventors: Franciscus Gerardus Henricus Duijnhoven Van, NX Mierlo (NL); Franciscus Wilhelmus Maria Gelissen, Selfkant-Suesterseel (DE)

(73) Assignee: Merck Patent GmbH, Darmstadt (DE)

( * ) Notice: Subject to any disclaimer, the term of this patent is extended or adjusted under 35 U.S.C. 154(b) by 1173 days.

(21) Appl. No.: 12/666,832

(22) PCT Filed: Jun. 30, 2008

(86) PCT No.: PCT/EP2008/058363
§ 371 (c)(1),
(2), (4) Date: Jul. 12, 2010

(87) PCT Pub. No.: WO2009/003976
PCT Pub. Date: Jan. 8, 2009

(65) Prior Publication Data
US 2011/0034609 A1     Feb. 10, 2011

(30) Foreign Application Priority Data
Jun. 29, 2007 (EP) .................................. 07012782

(51) Int. Cl.
| | |
|---|---|
| *C08L 83/00* | (2006.01) |
| *B41M 5/26* | (2006.01) |
| *C08K 3/00* | (2006.01) |
| *C08K 3/22* | (2006.01) |
| *B01J 13/04* | (2006.01) |

(52) U.S. Cl.
CPC .............. *B41M 5/267* (2013.01); *C08K 3/0075* (2013.01); *C08K 3/2279* (2013.01); *C08K 3/0083* (2013.01); *C08K 3/0091* (2013.01); *C08K 3/22* (2013.01); *B01J 13/04* (2013.01)

(58) Field of Classification Search
CPC ...... C08K 3/22; C08K 3/0075; C08K 3/0083; C08K 3/0091; C08K 3/2279; B41M 5/267; B01J 13/04

USPC .......................................... 523/201; 525/902
See application file for complete search history.

(56) References Cited

U.S. PATENT DOCUMENTS

| | | | |
|---|---|---|---|
| 4,576,891 A | 3/1986 | Adair et al. | |
| 6,048,387 A | 4/2000 | Shibahashi et al. | |
| 6,414,052 B1* | 7/2002 | Komura et al. | 523/215 |
| 6,693,657 B2* | 2/2004 | Carroll, Jr. et al. | 347/224 |
| 7,291,394 B2* | 11/2007 | Winkler et al. | 428/403 |
| 2002/0037261 A1 | 3/2002 | Lapidot et al. | |
| 2004/0253443 A1* | 12/2004 | Anselmann et al. | 428/403 |
| 2006/0074165 A1 | 4/2006 | Gelissen et al. | |
| 2006/0148968 A1 | 7/2006 | Van Duijnhoven et al. | |
| 2009/0209420 A1* | 8/2009 | Kalgutkar et al. | 503/201 |

FOREIGN PATENT DOCUMENTS

| | | |
|---|---|---|
| EP | 0 420 674 A1 | 4/1991 |
| EP | 0 908 501 A1 | 4/1999 |
| WO | WO 2004/050767 A1 | 6/2004 |

OTHER PUBLICATIONS

International Search Report of PCT/EP2008/058363 (Sep. 4, 2008).

* cited by examiner

*Primary Examiner* — Peter D Mulcahy
(74) *Attorney, Agent, or Firm* — Millen, White, Zelano & Branigan P.C.

(57) ABSTRACT

The present invention relates to Microsphere comprising a core and a shell, in which the core comprises a polymer and at least two laser light absorber. The particle size of the microsphere is for example between 50 nm and 50 micron and preferably between 100 nm and 10 micron. The core comprises a thermoplastic polymer, the shell comprises a compatibilizer. The laser light absorbers are chosen from oxides, hydroxides, sulphides, sulphates and phosphates of metals such as copper, bismuth, tin, aluminum, zinc, silver, titanium, antimony, manganese, iron, nickel, barium, gallium, germanium, arsenic and chromium and combinations of two or more of these metals, laser light absorbing (in)organic dyes or metaloxide coated flakes. The invention further relates to the use of the microsphere as a laser marking additive and to a process for the production of the microsphere by reactive extrusion.

13 Claims, 1 Drawing Sheet

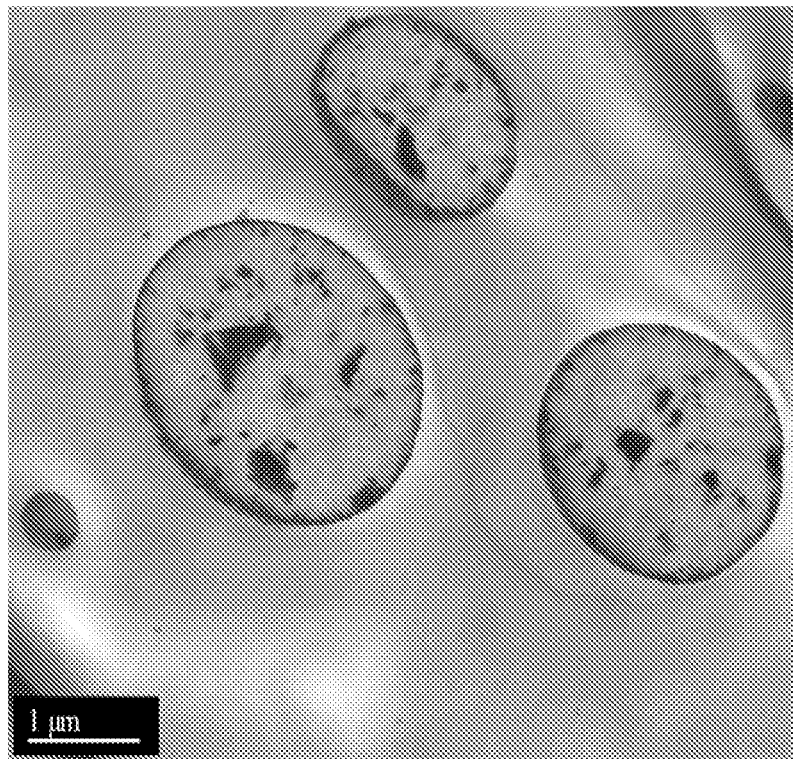

MICROSPHERE COMPRISING A POLYMER CORE, A SHELL AND AN ABSORBER

The invention relates to a microsphere comprising a core, a shell and laser light absorber. The invention further relates to the use of the microsphere as a laser marking additive. The present invention also relates to a process for the production of the microsphere.

It is generally known that certain materials, such as polymers can upon irradiation with laser light absorb energy from the laser light and are able to transfer this energy into heat which can induce a color change reaction in the material. Laser light absorbers are used to improve the laser light absorption in case the intrinsic ability of a polymer to absorb laser light is insufficient. Many polymers however appear not to yield an acceptable contrast upon laser irradiation even when mixed with a laser light absorber because the color forming ability of the polymer is insufficient.

From WO 01/0719 it is known to apply antimony trioxide with a particle size of at least 0.5 μm as an absorber. The absorber is applied in a polymeric composition in such content that the composition contains at least 0.1 wt. % of the absorber so as to be able to apply a dark marking against a light background in the composition. Preferably a nacreous pigment is further added to obtain a better contrast. Despite the use of two absorbers in the polymeric composition, the composition still has the disadvantage that in many cases, in particular in compositions with polymers that in themselves are only weakly color forming, only a poor contrast can be obtained by laser irradiation at low marking speeds. Furthermore, as the laser additives are dispersed throughout the matrix in non confined areas carbonisation also occurs in non confined areas and hence the resolution of marking is limited. To further improve contrast and resolution, microspheres were found comprising a core, a shell and a laser light absorber as known from WO-A-2004050766. These microspheres have proven to provide a better resolution and contrast by laser irradiation than the composition disclosed in WO 01/0719. However, the contrast obtained with these microspheres especially at (very) high marking speeds is still relatively low. Moreover, high contrast is mainly obtained while marking with high laser pulse energies. Marking should therefore preferentially be performed in focus of the laser beam which limits the marking area per pulse and hence increases marking time. With the in WO-A-2004050766 disclosed microspheres, the achievable marking speed is also limited using lamp-pumped and fiber laser systems, as the laser pulse energy of such types of laser systems is limited in comparison to for instance diode-pumped laser systems.

The aim of the invention is to provide a microsphere which possesses a higher sensitivity to the laser light and hence provides dark markings with improved contrast compared to the microspheres known from WO-A-2004050766 at much higher marking speeds while marking in or out focus and independent of the pump source of the laser.

This aim is achieved by a microsphere comprising a core and a shell, in which the core comprises a polymer, at least two laser light absorbers and in which the shell comprises a compatibilizer.

Upon irradiation with laser light, polymeric compositions that contain the microsphere according to the invention are found to produce an unexpectedly high contrast between the irradiated and non-irradiated parts while marking in or out of focus and with a broader range of laser systems.

Surprisingly, it has been found that a microsphere comprising a core which comprises at least two laser light absorbers and a shell comprising a compatibilizer provides a much darker marking over a much larger range of laser parameters due to an unexpected large enhancement of the synergistic effect described in WO 01/0719. The enhancement must be due to the very close proximity of the laser light absorbers in the microsphere compared to a much larger distance between the two laser light absorbers in a polymer matrix. It has been found that one of the absorbers is responsible for absorption of the light and transferring this into heat, while the other absorber enhances the color forming reaction of the core of the microsphere under the influence of the heat released.

The laser light absorber used can be made of those substances that are capable of absorbing laser light of a certain wavelength. In practice this wavelength lies between 157 nm and 10.6 μm, the customary wavelength range of lasers. If lasers with larger or smaller wavelengths become available, other absorbers may also be considered for application in the additive according to the invention. Examples of such lasers working in the said area are $CO_2$ lasers (10.6 μm), Nd:YAG or Nd:YVO4 lasers (1064, 532, 355, 266 nm) and excimer lasers of the following wavelengths: $F_2$ (157 nm), ArF (193 nm), KrCl (222 nm), KrF (248 nm), XeCl (308 nm) and XeF (351 nm), FAYb fiber lasers, diode lasers and diode array lasers. Preferably Nd:YAG lasers and $CO_2$ lasers are used since these types work in a wavelength range which is very suitable for the induction of thermal processes that are applied for marking purposes. Such absorbers are known per se, as is the wavelength range within which they can absorb laser radiation. Various substances that may be considered for use as an absorber will be specified below.

Examples of laser light absorbers are oxides, hydroxides, sulphides, sulphates and phosphates of metals such as copper, bismuth, tin, aluminum, zinc, silver, titanium, antimony, manganese, iron, nickel and chromium, barium, gallium, germanium, arsenic and combinations of two or more of these metals, laser light absorbing (in)organic dyes or metal oxide coated flakes. Preferably the laser light absorbers are chosen from antimony trioxide, tin dioxide, barium titanate, titanium dioxide, aluminum oxide, copper-hydroxy-phosphate, copper-ortho-phosphate, copper-hydroxide, antimony-tin oxide, bismuthtrioxide, anthraquinone or azo dyes. Preferably the two laser light absorbers are antimony-trioxide and antimony-tin oxide, copper-hydroxy-phosphate, copper-orthophosphate, copper-hydroxide, antimony-tin oxide or metal oxide coated flakes. The metal oxide coated flakes are for example platelet-shaped substrates which have been coated with an optionally hydrated silicon dioxide coating or a coating of another insoluble silicate and over that coating another coating of tin dioxide doped with 0.5-50% by weight of antimony, arsenic, bismuth, copper, gallium, germanium, or a corresponding oxide thereof. More preferably the two laser light absorbers are antimony-trioxide and antimony-tin oxide.

The microsphere contains at most 95 wt. % of absorbers. At higher percentages the black forming capacity tends to decrease. Preferably the microsphere contains between 1-95 wt % of absorbers. More preferably the microsphere contains between 5-80 wt % of absorbers.

The core of the microsphere comprises a polymer which is preferably a thermoplastic polymer. Examples of thermoplastic polymers are polyolefins, polyesters, polyamides, polysulphones, polycarbonate, polyhydroxide, polyurethanes, PVC or styrenics. Examples of polyesters are polybutylene terephthalate (PBT) or polyethylene terephthalate (PET). Examples of polyamides are polyamide-6, polyamide-66, polyamide-46, polyamide-11, polyamide-12 and amorphous polyamides, for example polyamide-6I or polyamide-6T. An example of a styrenic is styrene-acrylonitril. To choose a suitable polymer the person skilled in the art will principally be guided by the desired degree of adhesion to the absorbers and the required color forming ability. The adhesion of the polymer to the absorbers most preferably is better than that of the compatibilizer. This secures the integrity of the microsphere during its processing. It is further unwanted that the absorbers and the polymer in the core can chemically react with one another. Such chemical reactions cause degradation of the absorbers and/or polymer leading to undesired by-products, discoloration and poor mechanical and marking properties.

In the microsphere according to the present invention the polymer in the core is embedded by a shell comprising a compatibilizer. The compatibilizer is responsible for forming the microsphere during production using reactive extrusion. Furthermore the compatibilizer, due to its different polarity than the core, enhances the integrity of the core while the microspheres are dispersed in a matrix polymer.

The compatibilizer for example comprises a thermoplastic polymer comprising functional groups such as carboxylic acid groups, ester groups and the anhydride and salt forms thereof, epoxy groups, amine groups, alkoxy silane groups or alcohol groups. The functional groups may however also be present in the polymer of the core or shell per se, such as the terminal carboxylic acid group in a polyamide, but may also have been applied to them by for example grafting. The compatibilizer in the present invention preferably is a grafted thermoplastic polymer. More preferably the compatibilizer is a grafted polyolefin. Polyolefin polymers are for example homo- and copolymers of one or more olefin monomers that can be grafted with an ethylenically unsaturated functionalized compound. Examples of suitable polyolefin polymers are ethylene and propylene homo and copolymers. Examples of suitable ethylene polymers are all thermoplastic homopolymers of ethylene and copolymers of ethylene with as co-monomer one or more α-olefins with 3-10 C-atoms, in particular propylene, isobutene, 1-butene, 1-hexene, 4-methyl-1-pentene and 1-octene, that can be prepared using the known catalysts such as for example Ziegler-Natta, Phillips and metallocene catalysts. The quantity of co-monomer as a rule lies between 0 and 50 wt. %, and preferably between 5 and 35 wt. %. Such polyethylenes are for example known as high-density polyethylene (HDPE), low-density polyethylene (LDPE), linear low-density polyethylene (LLDPE) and linear very low-density polyethylene (VL(L)DPE). Suitable polyethylenes have a density between 860 and 970 kg/m$^3$. Examples of suitable propylene polymers are homopolymers of propylene and copolymers of propylene with ethylene, in which the proportion of ethylene amounts to at most 30 wt. % and preferably at most 25 wt. %.

Examples of suitable ethylenically unsaturated functionalized compounds are the unsaturated carboxylic acids and esters and anhydrides and metallic or non-metallic salts thereof. Preferably the ethylenic unsaturation in the compound is conjugated with a carbonyl group. Examples are acrylic, methacrylic, maleic, fumaric, itaconic, crotonic, methyl crotonic and cinnamic acid and esters, anhydrides and possible salts thereof. Of the compounds with at least one carbonyl group, maleic anhydride is preferred.

Examples of suitable ethylenically unsaturated functionalized compounds with at least one epoxy ring are, for example, glycidyl esters of unsaturated carboxylic acids, glycidyl ethers of unsaturated alcohols and of alkyl phenols and vinyl and allyl esters of epoxy carboxylic acids. Glycidyl methacrylate is particularly suitable.

Examples of suitable ethylenically unsaturated functionalized compounds with at least one amine functionality are amine compounds with at least one ethylenically unsaturated group, for example allyl amine, propenyl, butenyl, pentenyl and hexenyl amine, amine ethers, for example isopropenylphenyl ethylamine ether. The amine group and the unsaturation should be in such a position relative to each other that they do not influence the grafting reaction to any undesirable degree. The amines may be unsubstituted but may also be substituted with for example alkyl and aryl groups, halogen groups, ether groups and thioether groups.

Examples of suitable ethylenically unsaturated functionalized compounds with at least one alcohol functionality are all compounds with a hydroxyl group that may or may not be etherified or esterified and an ethylenically unsaturated compound, for example allyl and vinyl ethers of alcohols such as ethyl alcohol and higher branched and unbranched alkyl alcohols as well as allyl and vinyl esters of alcohol substituted acids, preferably carboxylic acids and $C_3$-$C_8$ alkenyl alcohols. Further the alcohols may be substituted with for example alkyl and aryl groups, halogen groups, ether groups and thioether groups, which do not influence the grafting reaction to any undesirable degree.

Examples of oxazoline compounds that are suitable as ethylenically unsaturated functionalized compounds in the framework of the invention are for example those with the following general formula where each R, independently of the other hydrogen, is a halogen, a $C_1$-$C_{10}$ alkyl radical or a $C_6$-$C_{14}$ aryl radical.

The quantity of the ethylenically unsaturated functionalized compound in the polyolefin polymer functionalized by grafting preferably lies between 0.05 and 1 mg eq per gram me of polyolefin polymer. Most preferably the compatibilizer is a maleic anhydride grafted polyethylene or maleic anhydride grafted polypropylene.

The quantity of compatibilizer relative to polymer in the core of the microsphere lies for example between 2 and 50 wt. % and is preferably smaller than 30 wt. %.

Both the polymer in the core and shell are preferably thermoplastic polymers, as this will facilitate mixing of the absorbers into the polymer in the core and respectively of the microsphere into a matrix polymer to make it suitable for laser writing.

If the polymer in the core and the compatibilizer in the shell comprise functional groups these functional groups can be bound to each other. Thus, around the core of the microsphere a shell is present which can be bound to the polymer in the core by the respective functional groups.

The invention further relates to the use of the microspheres as a laser marking additive. The use of the microsphere as laser absorbing additive in a polymer matrix shows an optimal color forming ability. The activity of the microsphere seems to be based on transmission of the energy absorbed from the laser light to the polymer in the core. The polymer can decompose due to this heat release, which causes the color change.

The size of the microspheres preferably lies between 50 nm and 50 μm more preferably between 100 nm and 10 μm.

The absorbers are for example present in the microsphere in the form of particles. The particle size of the absorbers is determined by the requirement that the absorbers must be capable of being mixed into the polymer in the core. It is known to the person skilled in the art that this miscibility is determined by the total surface of a certain weight quantity of absorber and that the person skilled will readily be able to determine the lower limit of the particle size of the absorbers to be mixed in when knowing the desired size of the microspheres and the desired quantity of absorbers to be mixed in. Generally the $D_{50}$ of the absorbers will be not smaller than 50 nm and preferably not smaller than 100 nm.

Also a quantity of a carrier polymer that is not provided with a functionalized group may be present as additional shell material in the microsphere. As the carrier polymer the same polymers may be considered as those mentioned above for the compatibilizer, albeit in their non-functionalized form. The quantity of carrier polymer preferably lies between 20 and 60 wt. % of the total polymer in the core and shell and the absorbers. More preferably the quantity lies between 25 and 50 wt. %. Within said limits a microsphere is obtained that can suitably be mixed in through melt processing.

To provide a laser writable composition the microsphere is for example mixed into a matrix polymer. It is possible to choose the matrix polymer as the carrier polymer. If desired the matrix polymer can also be added as a further polymer so as to later achieve improved mixing into a larger quantity of the matrix polymer.

The polymer in the core, in the shell and in particular the carrier polymer may contain pigments, colorants and dyes. This has the advantage that no separate coloured masterbatch has to be added when the microspheres are mixed with a matrix polymer.

The invention also relates to a process for the preparation of the microsphere according to the invention by reactive extrusion. First the absorbers and the melt of the polymer forming the core are mixed. The ratio between the quantity of the polymer forming the core and the quantity of absorbers lies between 90 vol. %:10 vol. % and 60 vol. %:40 vol. %. More preferably this ratio lies between 80 vol. %:20 vol. % and 50 vol. %:50 vol. %. Secondly the mixture of absorbers and polymer melt is mixed with a compatibilizer. This mixing takes place above the melting point of both the polymer and compatibilizer preferably in the presence of a quantity of a non-functionalized carrier polymer. Carrier polymers that may be considered are in particular those which have been mentioned above as compatibilizer, but in their non-functionalized form. This carrier polymer does not need to be the same as the compatibilizer. The presence of the non-functionalized carrier polymer ensures adequate melt processability of the total mixture so that the desired homogeneous distribution of the microsphere is obtained.

To obtain a laser writable polymer composition the microsphere according to the present invention is mixed into a matrix polymer. It has been found that a composition of a matrix polymer and the microspheres according to the invention can be written with better contrast with laser light than the known compositions.

The invention therefore also relates to a laser writable composition, comprising a matrix polymer and a microsphere according to the present invention distributed therein. Examples of matrix polymers are UHMWPE, Solupor™, styrenics including ABS, SAN and polymethyl (meth)acrylate, polyurethane, polyesters including PET and PBT, polyoxymethylene (POM), PVC, polyethylene, polypropylene, polyamide, polymethyl (meth)acrylate, polyurethane, thermoplastic vulcanizates, of which SARLINK® is an example, thermoplastic elastomers, of which Arnitel® is an example, and silicone rubbers.

The laser writable composition according to the invention can also contain other additives known for enhancing certain properties of the matrix polymer or adding properties to it. Examples of suitable additives are reinforcing materials such as glass fibers and carbon fibers, nano-fillers like clays, including wollastonite, and micas, pigments, dyes and colorants, fillers such as calcium carbonate and talcum, processing aids, stabilizers, antioxidants, plasticizers, impact modifiers, flame retardants, mould release agents, foaming agents.

The amount of additive can vary from very small amounts such as 1 or 2 volume % up to 70 or 80 volume % or more, relative to the volume of the compound formed. Additives will normally be applied in such amounts that any negative influence on the contrast of the laser marking obtainable by irradiating the composition will be limited to an acceptable extent. A filled composition that shows remarkable good laser writability is a composition comprising a polyamide, in particular polyamide-6, polyamide 46 or polyamide 66, and talcum as a filler additive.

The laser writable composition according to the invention can be prepared by mixing the additive into the melted matrix polymer.

Almost any plastic object can be obtained in a laser writable form. Such objects can for example be provided with functional data, barcodes, logos, graphics, pictures and identification codes and they can find application in the medical world (e.g. tubes, containers for tissue samples or fluids, syringes, pots, covers), in the automotive business (e.g. fluid containers, cabling, components), in the telecom and E&E fields (GSM fronts, keyboards, micro circuit breakers), in security and identification applications (credit cards, identification cards, animal identification tags, labels, security straps), in advertising applications (logos, decorations on corks, golf balls, promotional articles), in packaging (mono and multilayer films, bottles, caps and closures including but not limited to screw caps for bottles, tamper proof caps and synthetic corks.

The invention will be elucidated on the basis of the following examples.

EXAMPLE I

Using a twin-screw extruder (ZSK 30 of Werner & Pfleiderer) a number of masterbatches, MB1-MB6 were made.

The respective proportions of core polymer, compatibilizer and carrier polymer are shown in Table 1, as are the absorber content and the size of the formed additive particles in the masterbatch.

The masterbatches were made with a throughput of 30 kg/h at an extruder speed of 300-400 rpm. The feed zone, barrel and die temperature of the extruder and the outlet temperature of the material are 170, 240, 260 and 287° C., respectively, if polyamide 6 (P1-1) is used as the first polymer, 180, 240, 260 and 260° C., respectively, if PBT (P1-3) is used as the first polymer and 290, 290, 290 and 295° C. if polyamide 6,6 (P1-2) is used as the first polymer.

TABLE 1

| | core polymer [wt. %] | | | compatibilizer [wt. %] | | carrier polymer [wt. %] | | Absorber [wt. %] | | | | Particle size |
|---|---|---|---|---|---|---|---|---|---|---|---|---|
| | P1-1 | P1-2 | P1-3 | P2-1 | P2-2 | P3-1 | P3-2 | A-1 | A-2 | A-3 | A-4 | [µm] |
| MB01 | 17.5 | | | 1.75 | | 28.25 | | 45.5 | 7.0 | | | 0.2-2.0 |
| MB02 | 17.5 | | | | 2.75 | | 27.25 | 45.5 | 7.0 | | | 0.3-3.0 |
| MB03 | 17.5 | | | 1.75 | | 28.25 | | 47.6 | | 4.9 | | 0.2-2.1 |
| MB04 | 17.5 | | | | 2.75 | | 27.25 | 47.6 | | 4.9 | | 0.3-3.0 |
| MB05 | | 17.5 | | 1.75 | | 28.25 | | 47.6 | | 4.9 | | 0.2-2.0 |
| MB06 | | | 14.0 | 1.4 | | 28.6 | | 53.0 | | | 3.0 | 0.2-2.0 |

Core polymer
P1-1. Polyamide K122 (DSM)
P1-2. Polybutylene terephthalate 1060 (DSM)
P1-3. Zytel 101 NC 010 (DuPont)
Compatibilizer
P2-1. Fusabond® MO525D polyethylene (Dupont) grafted with 0.9 wt. % MA
P2-2. Exxelor PO 1020 polypropylene (ExxonMobil) grafted with 0.5-1.0 wt. % MA
Carrier polymer
P3-1. Exact 0230® polyethylene (DEXPlastomers)
P3-2. Propylene ethylene random copolymer Sabic 597 S (Sabic)
Absorber(s):
A-1. Antimony trioxide with a $D_{50}$ of 1 micron (Campine)
A-2: LazerFlair LS825 (Merck)
A-3: Fabulase 322 (Budenheim)
A-4: Stanostat CP5C (Keeling&Walker)

Comparative Experiment A

For comparative purposes masterbatches, MB7-MB16, were made with only a single absorber, using a twin-screw extruder (ZSK 30 of Werner & Pfleiderer).
The respective proportions of core polymer, compatibilizer and carrier polymer used in the additive are shown in Table 2, as are the absorber content and the size of the formed additive particles in the masterbatch.
The masterbatches were made with a throughput of 30 kg/h at an extruder speed of 300-400 rpm. The feed zone, barrel and die temperature of the extruder and the outlet temperature of the material are 170, 240, 260 and 287° C., respectively, if polyamide 6 (P1-1) is used as the first polymer, 180, 240, 260 and 260° C., respectively, if PBT (P1-3) is used as the first polymer and 290, 290, 290 and 295° C. if polyamide 6,6 (P1-2) is used as the first polymer.

TABLE 2

| | Core polymer [wt. %] | | | Compatibilizer [wt. %] | | Carrier polymer [wt. %] | | Absorber [wt. %] | | | | Particle size |
|---|---|---|---|---|---|---|---|---|---|---|---|---|
| | P1-1 | P1-2 | P1-3 | P2-1 | P2-2 | P3-1 | P3-2 | A-1 | A-2 | A-3 | A-4 | [µm] |
| MB7 | 14.0 | | | 1.4 | | 28.6 | | 56.0 | | | | 0.2-2.0 |
| MB8 | 14.0 | | | | 2.2 | | 27.8 | 56.0 | | | | 0.3-3.0 |
| MB9 | | 14.0 | | 1.4 | | 28.6 | | 56.0 | | | | 0.2-2.0 |
| MB10 | | | 14.0 | 1.4 | | 28.6 | | 56.0 | | | | 0.2-2.0 |
| MB11 | 17.5 | | | 1.75 | | 73.75 | | | 7.0 | | | 0.2-2.0 |
| MB12 | 17.5 | | | | 2.75 | | 72.75 | | 7.0 | | | 0.3-3.0 |
| MB13 | 17.5 | | | 1.75 | | 75.85 | | | | 4.9 | | 0.2-2.0 |
| MB14 | 17.5 | | | | 2.75 | | 74.85 | | | 4.9 | | 0.3-3.0 |
| MB15 | | 17.5 | | 1.75 | | 75.85 | | | | 4.9 | | 0.2-2.0 |
| MB16 | | | 14.0 | 1.40 | | 81.60 | | | | | 3.0 | 0.2-2.0 |

EXAMPLE II

Masterbatches MB01-MB06 were used to prepare a number of laser writable compositions, LP1-LP12, by mixing the masterbatches MB01-MB06 into different matrix polymers (M1-M4) on the aforesaid extruder. The feed zone, barrel and die temperature of the extruder and the outlet temperature of the material for the different matrix polymers are as follows:
Matrix Polymers:
M1. Polyethylene Exact® 0230 (DEX Plastomers)
M2. Polypropylene homopolymer 112MN40 (DSM)
M3. Polybutylene terephthalate 1060 (DSM)
M4. Polyamide K122 (DSM)
M1: (Exact): 100, 120, 150, 158
M2: (PP): 160, 200, 210, 225
M3: (PBT): 180, 230, 240, 265
M4: (PA6): 160, 200, 220, 265
Table 3 gives the proportions of the different components in wt. %.
The laser writable compositions were injection moulded to form plates with a thickness of 2 mm. On the plates a pattern was written using a diode pumped Nd:YAG IR laser of Trumpf, type Vectormark compact, wavelength 1064 nm.
The degree to which the different laser writable compositions are laser writable, expressed in qualitative contrast values, is shown in Table 3.

Comparative Experiment B

Masterbatches MB07-MB16 were used to prepare a number of laser writable compositions, LP13-LP32 by mixing the masterbatches into different matrix polymers (M1-M4) on the aforesaid extruder.

Table 3 gives the proportions of the different components in wt. %. The laser writable compositions were injection moulded to form plates with a thickness of 2 mm. On the plates a pattern was written using a diode pumped Nd:YAG IR laser of Trumpf, type Vectormark compact, wavelength 1064 nm.

The degree to which the different laser writable compositions are laser writable, expressed in qualitative contrast values, is shown in Table 3.

Comparative Experiment C

Laser writable compositions LP33-LP38 were prepared by mixing matrix polymers M1 or M2 with two different single absorber containing masterbatches chosen from MB07-MB16

Table 3 gives the proportions of the different components in wt. %. The laser writable compositions were injection moulded to form plates with a thickness of 2 mm. On the plates a pattern was written using a diode pumped Nd:YAG IR laser of Trumpf, type Vectormark compact, wavelength 1064 nm.

The degree to which the different laser writable compositions are laser writable, expressed in qualitative contrast values, is shown in Table 3.

Comparative Experiment D

Laser writable compositions RF1-RF3 were prepared which contain only matrix polymer M1 and two absorbers chosen from A1-A4.

Table 3 gives the proportions of the different components in wt. %.

The laser writable compositions were injection moulded to form plates with a thickness of 2 mm. On the plates a pattern was written using a diode pumped Nd:YAG IR laser of Trumpf, type Vectormark compact, wavelength 1064 nm. The degree to which the different laser writable compositions are laser writable, expressed in qualitative contrast values, is shown in Table 3.

TABLE 3

| | LP01 | LP02 | LP03 | LP04 | LP05 | LP06 | LP07 | LP08 | LP09 | LP10 | LP11 | LP12 | LP13 | LP14 |
|---|---|---|---|---|---|---|---|---|---|---|---|---|---|---|
| M-1 | 97.0 | | | | 97.0 | | | | 97.0 | | 97.0 | | 97.0 | |
| M-2 | | | 97.0 | | | | 97.0 | | | | | | | 97.0 |
| M-3 | | 97.0 | | 97.0 | | 97.0 | | 97.0 | | | | | | |
| M-4 | | | | | | | | | | | 97.0 | | 97.0 | |
| MB01 | 3.0 | 3.0 | | | | | | | | | | | | |
| MB02 | | | 3.0 | 3.0 | | | | | | | | | | |
| MB03 | | | | | 3.0 | 3.0 | | | | | | | | |
| MB04 | | | | | | | 3.0 | 3.0 | | | | | | |
| MB05 | | | | | | | | | 3.0 | 3.0 | | | | |
| MB06 | | | | | | | | | | | 3.0 | 3.0 | | |
| MB07 | | | | | | | | | | | | | 3.0 | 3.0 |
| C | ••• | ••• | •••• | •••• | ••• | •••• | •••• | •••• | •••• | •••• | •••• | •••• | •• | •• |

| | LP15 | LP16 | LP17 | LP18 | LP19 | LP20 | LP21 | LP22 | LP23 | LP24 | LP25 | LP26 | LP27 | LP28 |
|---|---|---|---|---|---|---|---|---|---|---|---|---|---|---|
| M-1 | | | 97.0 | | 97.0 | | 97.0 | | | | 97.0 | | | |
| M-2 | 97.0 | | | | | | | | | 97.0 | | | 97.0 | |
| M-3 | | 97.0 | | | | | | 97.0 | | 97.0 | | 97.0 | | 97.0 |
| M-4 | | | | 97.0 | | 97.0 | | | | | | | | |
| MB07 | | | | | | | | | | | | | | |
| MB08 | 3.0 | 3.0 | | | | | | | | | | | | |
| MB09 | | | 3.0 | 3.0 | | | | | | | | | | |
| MB10 | | | | | 3.0 | 3.0 | | | | | | | | |
| MB11 | | | | | | | 3.0 | 3.0 | | | | | | |
| MB12 | | | | | | | | | 3.0 | 3.0 | | | | |
| MB13 | | | | | | | | | | | 3.0 | 3.0 | | |
| MB14 | | | | | | | | | | | | | 3.0 | 3.0 |
| C | •• | •• | •• | •• | •• | •• | •• | •• | •• | •• | •• | •• | •• | •• |

| | LP29 | LP30 | LP31 | LP32 | LP33 | LP34 | LP35 | LP36 | LP37 | LP38 | RF1 | RF2 | RF3 |
|---|---|---|---|---|---|---|---|---|---|---|---|---|---|
| M-1 | 97.0 | | 97.0 | | 94.0 | | 94.0 | | 94.0 | 94.0 | 98.43 | 98.42 | 98.32 |
| M-2 | | | | | | 94.0 | | 94.0 | | | | | |
| M-4 | | 97.0 | | 97.0 | | | | | | | | | |
| MB07 | | | | | 3.0 | | 3.0 | | | | | | |
| MB08 | | | | | | 3.0 | | 3.0 | | | | | |
| MB09 | | | | | | | | | 3.0 | | | | |
| MB10 | | | | | | | | | | 3.0 | | | |
| MB11 | | | | | 3.0 | | | | | | | | |
| MB12 | | | | | | 3.0 | | | | | | | |
| MB13 | | | | | | | 3.0 | | | | | | |
| MB14 | | | | | | | | 3.0 | | | | | |
| MB15 | 3.0 | 3.0 | | | | | | | 3.0 | | | | |
| MB16 | | | 3.0 | 3.0 | | | | | | 3.0 | | | |
| A-1 | | | | | | | | | | | 1.37 | 1.43 | 1.59 |

TABLE 3-continued

| | | | | | | | | | | | | | |
|---|---|---|---|---|---|---|---|---|---|---|---|---|---|
| A-2 | | | | | | | | | | 0.21 | | | |
| A-3 | | | | | | | | | | | 0.15 | | |
| A-4 | | | | | | | | | | | | 0.9 | |
| C | •• | •• | •• | •• | ••• | ••• | ••• | ••• | ••• | ••• | •• | •• | •• |

The contrast measurements were carried out with a Minolta 3700D Spectrophotometer with the following settings:
CIELAB, light source 6500 Kelvin (D65),
spec colour included (SCI) and angle of measurement 10°.
The laser settings were continually optimized to the maximum feasible contrast at the used wavelength of 1064 nm.

| Qualification of contrast: | |
|---|---|
| Very poor contrast and granular | — |
| Poor contrast | • |
| Moderate contrast | •• |
| Good contrast | ••• |
| Very good contrast | •••• |
| Excellent contrast | ••••• |

From table 3 it is clear that the plates manufactured from materials containing the additive according to the invention (LP01-LP12) can be written with a laser with a considerably better result than compositions in which only a single absorber is present in comparable quantities (LP13-LP32). Moreover, the plates manufactured from materials containing the additive according to the invention can be written with a laser with a considerably better result than compositions in which the two absorbers are introduced in two separate single absorber containing masterbatches with comparable quantities (LP33-LP38), or in which only the two absorbers are mixed in the matrix polymer (RF1-RF3).

FIG. 1 shows a TEM picture of laser writable composition LP01.

The invention claimed is:

1. A microsphere, comprising a core and a shell, in which the core comprises a polymer, at least two laser light absorbers each, independently, chosen from antimony trioxide, tin dioxide, barium titanate, titanium dioxide, aluminum oxide, copper-hydroxy-phosphate, copper-ortho-phosphate, copper-hydroxide, antimony-tin oxide and bismuthtrioxide, and in which the shell comprises a compatibilizer.

2. A microsphere according to claim 1, which has a particle size of between 50 nm and 50 micron.

3. A microsphere according to claim 1, which has a particle size of between 100 nm and 10 micron.

4. A microsphere according to claim 1, wherein the core comprises a thermoplastic polymer.

5. A microsphere according to claim 1, wherein the at least two laser light absorbers are antimony-trioxide and antimony-tin oxide.

6. A microsphere according to claim 1, wherein the thermoplastic polymer is a polyolefine, polyester, polyamide, polysulphone, polycarbonate, polyhydroxide, polyurethane, PVC or styrenic polymer.

7. A microsphere according to claim 1, wherein the compatibilizer is a grafted thermoplastic polymer.

8. A microsphere according to claim 7, wherein the grafted thermoplastic polymer is maleic anhydride grafted polyethylene or maleic anhydride grafted polypropylene.

9. A laser marking additive, comprising a microsphere according to claim 1 and one or more carriers suitable for a laser marking additive.

10. A process for preparing a microsphere according to claim 1, comprising preparing said microsphere by reactive extrusion.

11. A laser writable composition, comprising a matrix polymer and a microsphere according to claim 1.

12. A method for laser marking a polymer, comprising laser marking said polymer to which a microsphere according to claim 1 has been added.

13. A method for preparing a laser markable polymer, comprising adding a microsphere according to claim 1 to said polymer.

* * * * *